United States Patent [19]

Buskness

[11] Patent Number: 5,460,070
[45] Date of Patent: Oct. 24, 1995

[54] FENCE FOR TABLE SAWS

[76] Inventor: Earl C. Buskness, 2716 E. Kanesville Blvd., Council Bluffs, Iowa 51503-0516

[21] Appl. No.: 318,422

[22] Filed: Oct. 5, 1994

[51] Int. Cl.⁶ .................................................. B27B 27/02
[52] U.S. Cl. ........................ 83/438; 83/468.7; 269/303
[58] Field of Search .................... 83/438, 468, 468.7, 83/522.18, 522.19; 269/303, 315

[56] References Cited

U.S. PATENT DOCUMENTS

| | | | |
|---|---|---|---|
| 1,991,431 | 2/1935 | Tyler | 269/315 |
| 2,166,703 | 7/1939 | Boice | 83/438 |
| 2,520,837 | 8/1950 | Hammond | 83/522.19 X |
| 2,754,859 | 7/1956 | Ocenasek | 83/438 |
| 2,852,049 | 9/1958 | Peterson | 83/438 |
| 3,315,716 | 4/1967 | Mytinger | 83/438 |
| 4,206,910 | 6/1980 | Biesemeyer | 83/522.19 X |
| 4,635,515 | 1/1987 | Altman | 83/438 |
| 4,964,450 | 10/1990 | Hughes et al. | 83/438 X |

*Primary Examiner*—Eugenia Jones
*Attorney, Agent, or Firm*—Zarley, McKee, Thomte, Voorhees & Sease; Mark D. Frederiksen

[57] ABSTRACT

A fence for a saw table includes a threaded shaft rotatably mounted parallel to one side edge of the saw table platform and a guide fence operably mounted on the shaft to move longitudinally as the shaft is rotated. The guide fence is mounted to the shaft on a mounting block with a locking mechanism which permits the block to be affixed to the threaded shaft so that the guide fence may be pivoted to a storage position on the shaft, and then returned to an operable position in the same place on the saw table. A handle mounted on the end of the threaded shaft permits longitudinal movement of the guide fence along the saw table. A wheel mounted on the free end of the guide fence supports the guide fence end slightly above the surface of the saw table.

6 Claims, 4 Drawing Sheets

FENCE FOR TABLE SAWS

TECHNICAL FIELD

The present invention relates generally to saw fences, and more particularly to an improved saw fence which may be permanently mounted to a table saw and moved between operable and storage positions.

BACKGROUND OF THE INVENTION

Saw fences have been utilized with table saws for many years. Typically, the saw fence is removably mounted on the upper surface of the saw table, and is adjustable relative to the saw blade to produce uniform cuts. However, one disadvantage of typical saw fences for table saws is that they must be completely removed from the saw table in order to utilize the table saw for large pieces of wood, or when not in use.

Another difficulty with many saw fences is in the fastening of the fence to the table so that both ends are spaced an equal distance from the saw blade, for a straight cut.

SUMMARY OF THE INVENTION

It is therefore a general object of the present invention to provide an improved permanent saw fence for a saw table.

Another object is to provide a permanent saw fence which may be moved to a storage position and then replaced on the saw table at an identical position.

Still another object of the present invention is to provide a permanent saw fence which is easily adjustable without requiring the separate adjustment of the ends of the fence.

Still another object is to provide a permanent saw fence which is simple to use, and economical to manufacture.

These and other objects will be apparent to those skilled in the art.

The fence for a saw table of the present invention includes a threaded shaft rotatably mounted parallel to one side edge of the saw table platform and a guide fence operably mounted on the shaft to move longitudinally as the shaft is rotated. The guide fence is mounted to the shaft on a mounting block with a locking mechanism which permits the block to be affixed to the threaded shaft so that the guide fence may be pivoted to a storage position on the shaft, and then returned to an operable position in the same place on the saw table. A handle mounted on the end of the threaded shaft permits longitudinal movement of the guide fence along the saw table. A wheel mounted on the free end of the guide fence supports the guide fence end slightly above the surface of the saw table.

DESCRIPTION OF THE PREFERRED EMBODIMENT

Figure 1:
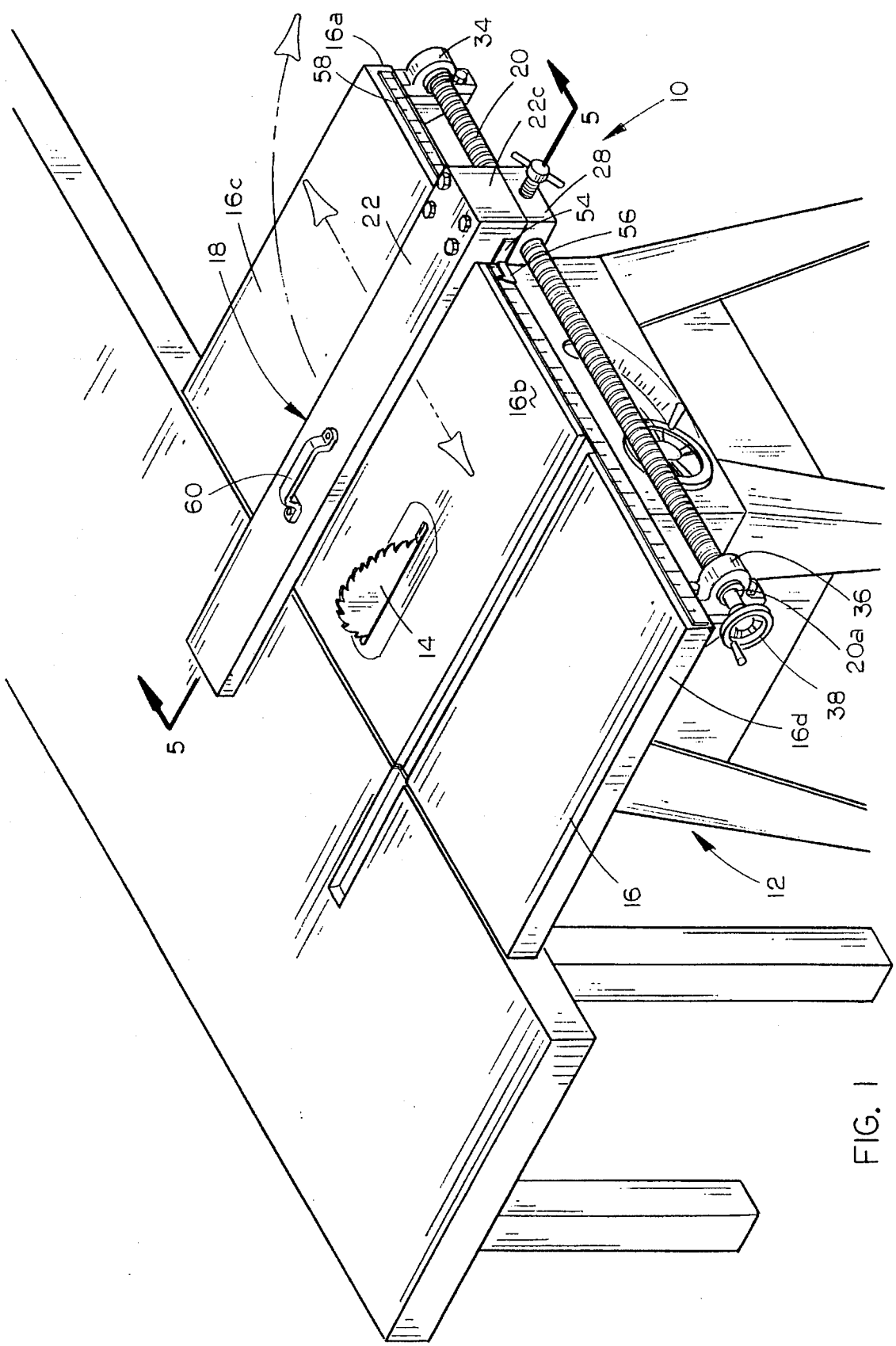
FIG. 1 is a perspective view of the present invention installed on a saw table.

Referring now to the drawings, in which similar or corresponding pads are identified with the same reference numeral, and more particularly to FIG. 1, the saw fence of the present invention is designated generally at 10 and is shown operably mounted on a conventional saw table 12 having a saw blade 14 projecting from the platform 16 of saw table 12.

Saw fence 10 includes a guide fence 18 pivotally and adjustably mounted on a threaded shaft 20, which is mounted parallel to one side edge 16a of platform 16. Guide fence 18 includes a guide arm 22 which slides along the upper surface 16b to guide a piece of wood relative to saw blade 14.

Figure 2:
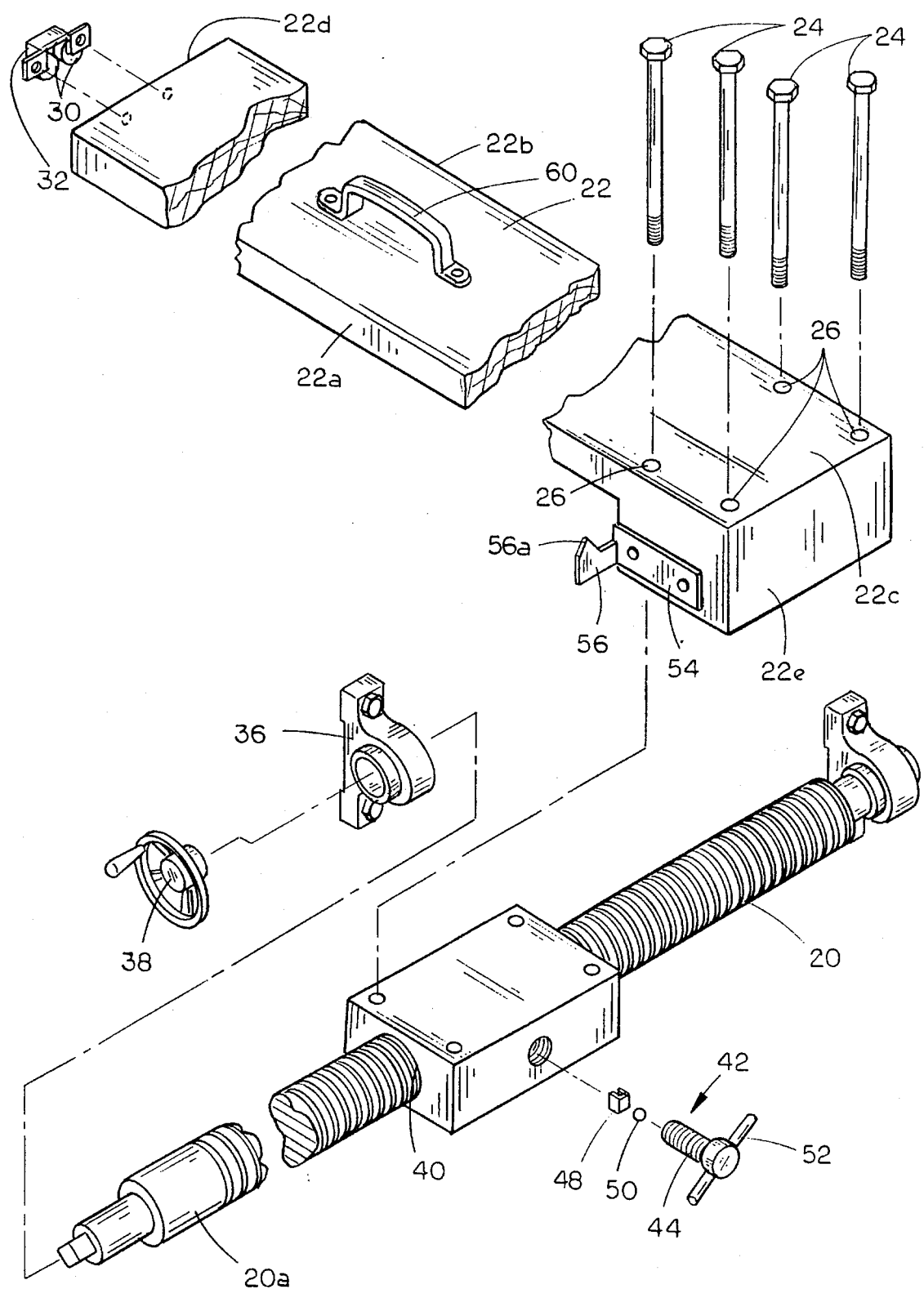
FIG. 2 is an exploded perspective view of the invention.
Figure 3:
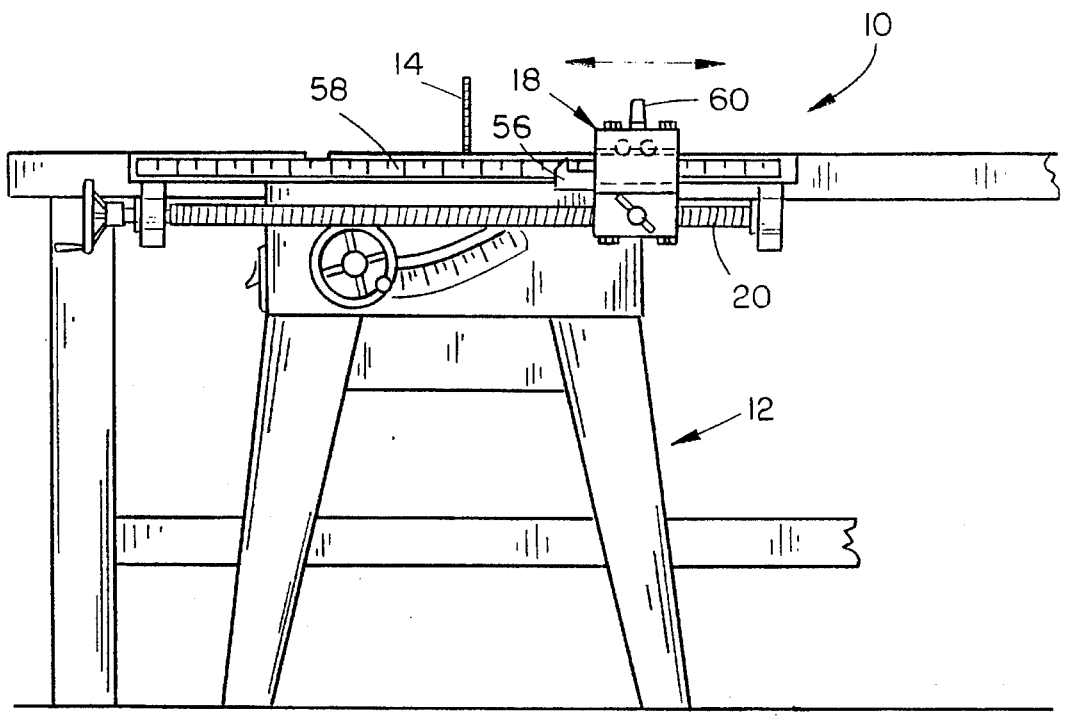
FIG. 3 is an elevational view of the invention installed on a saw table, taken from the front of the saw table.

Referring now to FIG. 2, guide arm 22 includes a forward longitudinal edge 22a, and an opposing longitudinal edge 22b, formed parallel to one another. A first end 22c of guide arm 22 has four bolts 24 projecting through vertical apertures 26 therein, and threaded into an adjustable mounting block 28 which is operably connected to shaft 20, as described in more detail hereinbelow.

Figure 5:
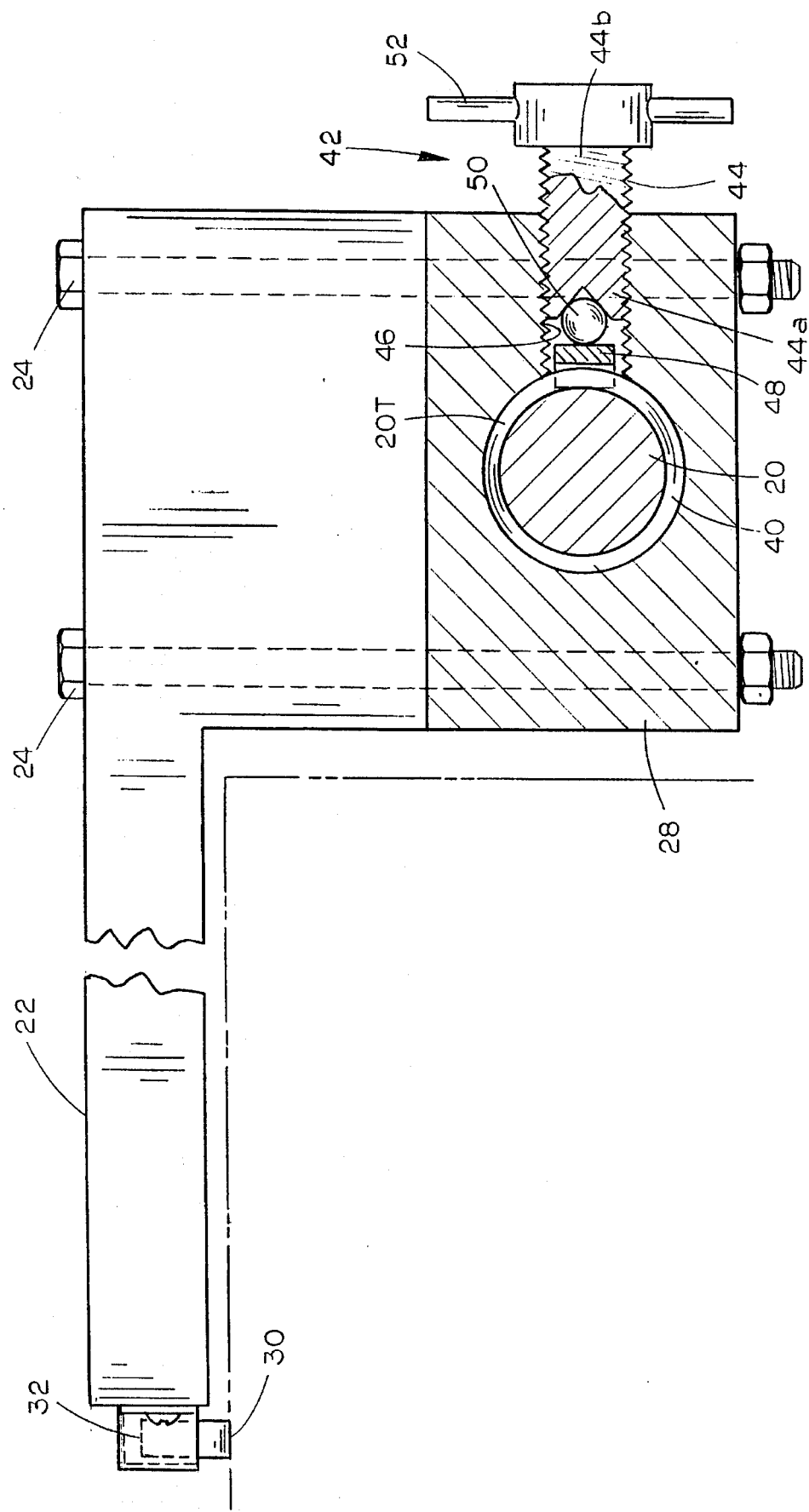
FIG. 5 is a sectional view taken at lines 5—5 in FIG. 1.

A pair of wheels 30 are rotatably mounted in a wheel housing 32 which is affixed to the second end 22d of guide arm 22 (also shown in FIG. 5). Housing 32 is mounted such that wheels 30 support guide arm 22 approximately 1/32 of an inch of the upper surface 16b of platform 16. Referring once again to FIGS. 1 and 2, shaft 20 is rotatably mounted between a pair of pillow blocks 34 and 36, thereby permitting rotation of shaft 20 on its longitudinal axis. Pillow blocks 34 and 36 are affixed to opposing ends 16c and 16d of platform 16 so as to maintain shaft 20 parallel to the side edge 16a of platform 16. The forward end 20a of shaft 20 projects through forward pillow block 36 and has a hand operated wheel 38 mounted thereon, to permit selective rotation of shaft 20. Mounting block 28 has a threaded aperture 40 extending longitudinally therethrough which engages the threads of shaft 20, such that mounting block 28 is moved along shaft 20 as shaft 20 is rotated.

A lock mechanism 42 is provided on mounting block 28 which selectively affixes mounting block 28 in position on shaft 20, as shown in FIGS. 2 and 5. Block mechanism 42 includes a threaded shank 44 which is threaded into a threaded hole 46 formed through one side wall 28a of mounting block 28. A generally U-shaped clip 48 is inserted within hole 46 with the legs of the clip engaging the threads 20t of shaft 20. A ball bearing 50 is inserted within hole 46 between the inward end 44a of shank 44 and the base of clip 48. A handle 52 on the outer end 44b of shank 44 permits rotation of shank 44 to thereby selectively apply pressure on clip 48 and thereby apply a biasing force against shaft 20 to prevent movement of mounting block 28 along shaft 20.

Guide arm 22 includes a depending leg 22e on the first end 22c, as shown in FIG. 2. A plate 54 having a projecting pointer arm 56 is mounted to the forward edge 22a of depending leg 22e, with pointer arm 56 projecting perpendicularly therefrom and immediately adjacent the saw table platform 16, as shown in FIG. 1. Pointer arm 56 includes an upwardly projecting point 56a which is located immediately proximal to a measuring ruler 58 mounted on side edge 16a of platform 16. Thus, movement of guide fence 18 along shaft 20 may be precisely located along ruler 58.

Figure 4:
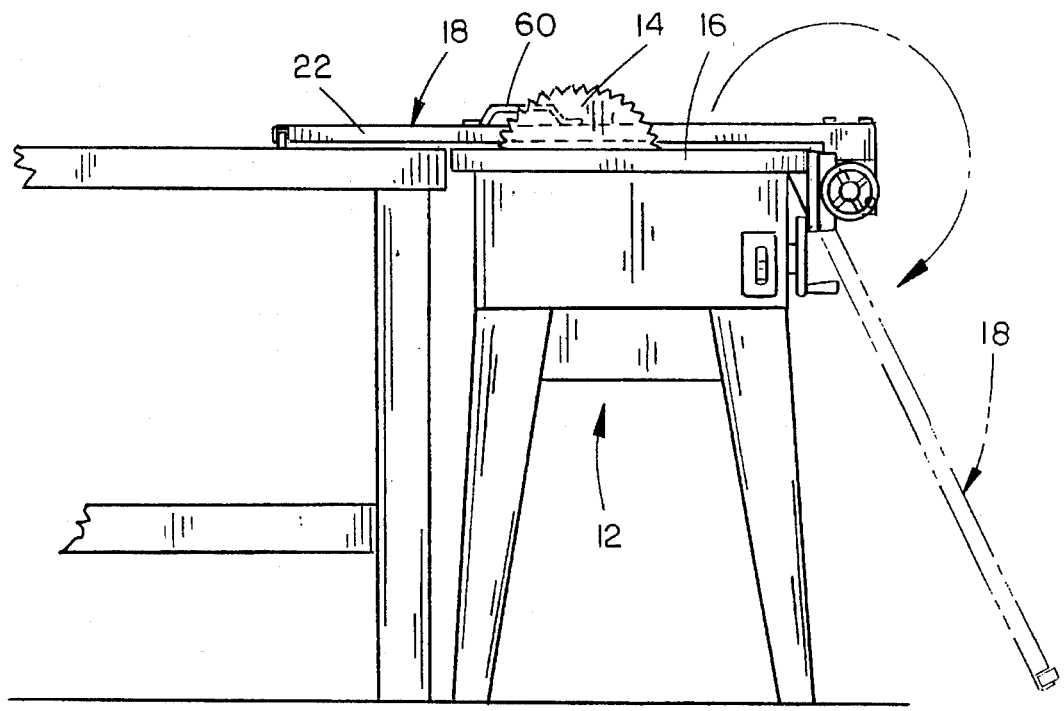
FIG. 4 is an end elevational view of the saw table with the invention installed thereon.

Referring to FIGS. 1 and 4, it can be seen that guide fence 18 may be pivoted on shaft 20 to move from a working position, shown in solid lines, to a storage position shown in broken lines in FIG. 4. Because guide fence 18 pivots on a threaded shaft 20, it can be seen that the guide fence will be repositioned to the same position on platform 16 when pivoted from the storage to working positions. Thus, if it is desired to cut a piece of wood for which the guide fence is not needed, the guide fence can be pivoted to the storage position, the wood cut, and then returned to the same position on the saw table 12, without having to remeasure the position of the guide fence 18. A handle 60 on guide arm 22 permits easy pivoting of guide arm 22 on shaft 20.

Whereas the invention has been shown and described in connection with the preferred embodiment thereof, many modifications, substitutions and additions may be made which are within the intended broad scope of the appended claims.

I claim:

1. A fence for a saw table, comprising:

a threaded shaft rotatably mounted on forward and rearward bearings for rotatable movement along the longitudinal axis of the shaft;

means on said shaft for selectively rotating the shaft about its rotational axis;

a guide fence for guiding a work piece along an upper surface of a saw table, said guide fence having first and second ends, the first end being operably connected to said shaft for longitudinal movement along the shaft in response to rotation of the shaft;

said guide fence including a mounting block connected to the first end thereof, said mounting block including a longitudinal threaded aperture extending therethrough engaging the threaded shaft, such that rotation of the shaft moves the block longitudinally;

a locking mechanism operably connected between said block and said shaft for selectively affixing said guide fence to said shaft, such that the guide fence pivots with the shaft about the rotational axis of the shaft;

said locking mechanism including a threaded radial aperture formed in said mounting block having an axis extending radially from said shaft;

a threaded shank operably mounted in said radial aperture for selective radial movement, said shank having a forward end and rearward end;

said rearward end of said shank having a handle mounted thereon for selectively rotating said shank to move the forward end of said shank radially within the radial aperture;

a clip interposed in said mounting block radial aperture between said shaft and said shank, said clip having a pair of spaced apart legs projecting from a base, said legs engaging the threads of said shaft; and a ball bearing interposed between said clip base and said shank forward end.

2. The fence of claim 1, further comprising means on the second end of the guide fence for movably supporting the guide fence second end above a saw table platform.

3. The fence of claim 2, wherein said movable support means includes a wheel rotatably mounted on the guide fence second end, with a lower portion projecting below a lower surface of the guide fence, said wheel having a rotational axis oriented perpendicular to the longitudinal axis of the guide fence.

4. In combination:

a table saw having a generally horizontal platform with a saw blade projecting upwardly through an upper surface thereof, said platform having forward and rearward ends and opposing first and second edges;

forward and rearward spaced apart bearings mounted on said platform proximal said first side edge;

a threaded shaft rotatably mounted in said bearings for rotational movement about the longitudinal axis of said shaft, and oriented parallel to said platform first side edge;

means connected to said shaft for selectively rotating said shaft;

a guide fence for guiding a work piece on the upper surface of said platform, said guide fence having first and second ends, the first end being operably connected to said shaft for longitudinal movement along said shaft in response to rotation of said shaft;

said guide fence including a mounting block connected to the first end thereof, said mounting block including a longitudinal threaded aperture extending therethrough engaging said threaded shaft, such that rotation of said shaft moves said block longitudinally;

a locking mechanism operably connected between said block and said shaft for selectively affixing said guide fence to said shaft, such that the guide fence pivots with the shaft about the rotational axis of the shaft;

said locking mechanism including a threaded radial aperture formed in said mounting block having an axis extending radially from said shaft;

a threaded shank operably mounted in said radial aperture for selective radial movement, said shank having a forward end and rearward end;

said rearward end of said shank including a handle mounted thereon for selectively rotating said shank to move the forward end of said shank radially within the radial aperture;

a clip interposed in said mounting block radial aperture between said shaft and said shank, said clip having a base and a pair of spaced apart legs projecting from said base, said legs engaging the threads of said shaft; and a ball bearing interposed between said clip base and said shank forward end.

5. The fence of claim 4, further comprising means on the second end of the guide fence for movably supporting the guide fence second end above a saw table platform.

6. The fence of claim 5, wherein said movable support means includes a wheel rotatably mounted on the guide fence second end, with a lower portion projecting below a lower surface of the guide fence, said wheel having a rotational axis oriented perpendicular to the longitudinal axis of the guide fence.

* * * * *